April 28, 1953 H. W. BAEHR 2,636,593
CONVEYER FLIGHT CLEANER
Filed July 6, 1946 2 SHEETS—SHEET 1

INVENTOR.
Herman W. Baehr,
BY Morsell + Morsell
ATTORNEYS.

April 28, 1953  H. W. BAEHR  2,636,593
CONVEYER FLIGHT CLEANER
Filed July 6, 1946
2 SHEETS—SHEET 2
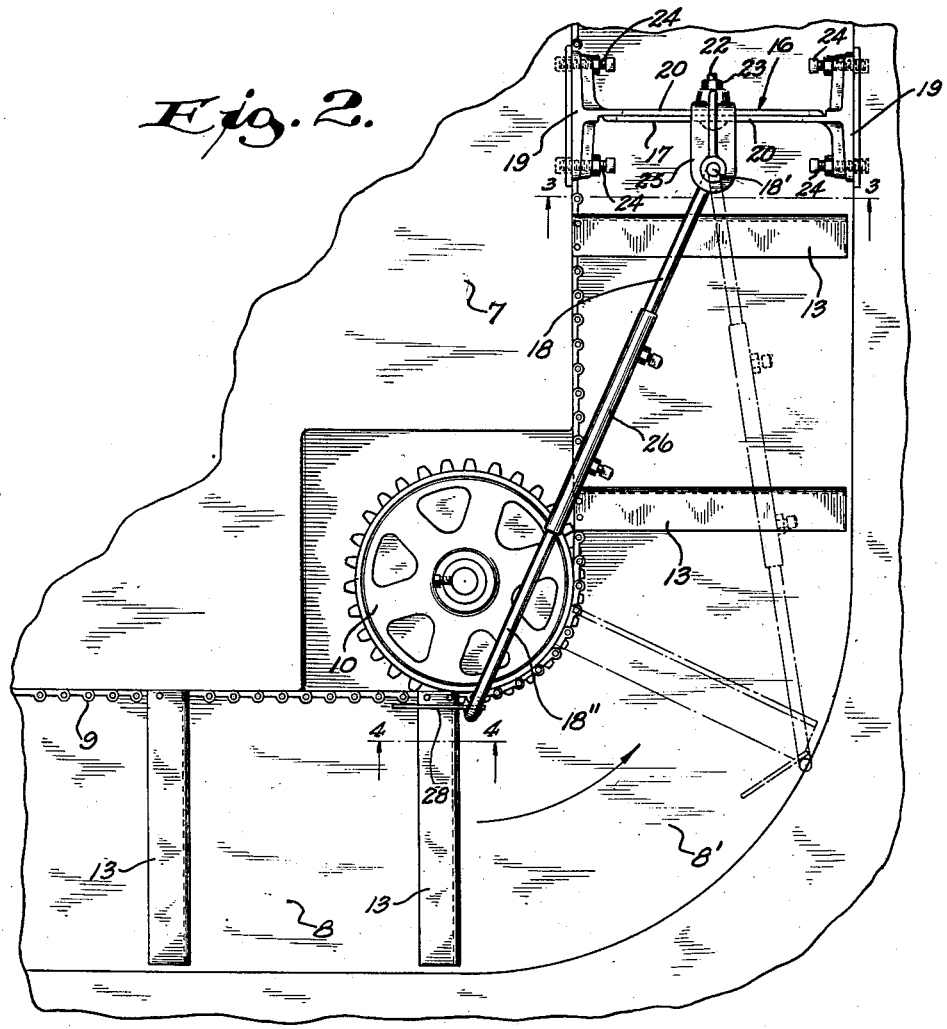
Fig. 2.
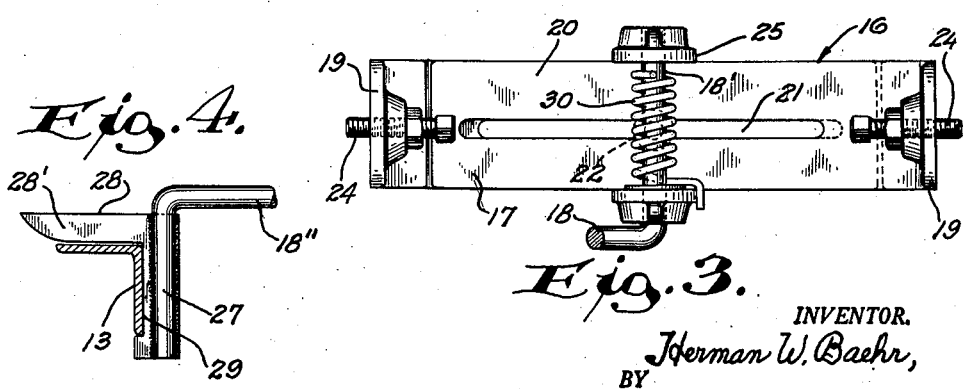
Fig. 4.
Fig. 3.
INVENTOR.
Herman W. Baehr,
BY Morsell & Morsell.
ATTORNEYS Patented Apr. 28, 1953

2,636,593

UNITED STATES PATENT OFFICE 2,636,593

CONVEYER FLIGHT CLEANER

Herman W. Baehr, Waupaca, Wis., assignor to Eagle Manufacturing Company, Appleton, Wis., a corporation of Wisconsin Application July 6, 1946, Serial No. 681,715

9 Claims. (Cl. 198—229)

This invention relates to improvements in conveyor flight cleaners.

Although the invention is not to be limited thereto, it finds particular utility in connection with the flights of conveyors used in installations such as barn cleaners. There are available for animal barns automatic cleaners in the form of flight equipped endless conveyors movably mounted in continuous troughs formed in the barn floors adjacent the rear of the stalls. In a barn floor trough of the type mentioned, a conveyor is adapted to operate therein for the purpose of conveying the litter from the livestock stalls to a conveniently arranged outgoing conveyor and the latter transports the litter exteriorly of the barn for deposit into a vehicle or in a pile.

In the type of installations under consideration, material will stick to and accumulate on the conveyor flights unless provision is made for the periodic brushing or scraping of the flights.

With the above in mind, it is, therefore, a primary object of the present invention to provide a mechanism which will automatically successively scrape and clean the flights of a conveyor as the flights come into contact therewith.

In barn cleaner conveyors, the flights are customarily of angled formation and a more specific object of the present invention is to provide a conveyor flight cleaner which will automatically simultaneously clean the exposed angularly related surfaces of a conveyor flight.

A further object of the invention is to provide a conveyor flight cleaner which is automatically operated and caused to longitudinally traverse the entire extent of a flight by the movement of the conveyor.

A further object of the invention is to provide a conveyor flight cleaner which, at its position of rest, is adapted to engage the inner end of a flight moved into contact therewith, and during advancement of the flight along its path of travel, the cleaner will longitudinally traverse the flight, ultimately moving free of the opposite end thereof and automatically returning to its original position for subsequent engagement with the inner end of a successive conveyor flight.

A further object of the invention is to provide, in combination with a movable conveyor, disposed to travel in a horizontal path, a swingable flight cleaner pivotally mounted on an axis perpendicular to the path of movement of a conveyor flight, the mounting of the cleaner arm being such as to cause the plow end of the flight cleaner to act in one direction only while cleaning the conveyor flight.

A further object of the invention is to provide a conveyor flight cleaner which may be easily installed in a conveyor trough in a manner so as not to interfere with the functioning and travel of the conveyor.

A further object of the invention is to provide a conveyor flight cleaner which may be longitudinally adjusted for mounting in conveyor troughs of various widths.

A further object of the invention is to provide a conveyor flight cleaner in which the arm portion thereof may be adjusted to increase or decrease its length to adapt the cleaner for use in connection with flights of various lengths.

A further object of the invention is to provide a conveyor flight cleaner which is of very simple construction, which is strong and durable, which is easy to install, which is automatic and efficient in operation, and which is well adapted for the purposes described.

With the above and other objects in view, the invention consists of the improved conveyor flight cleaner and its parts and combinations as set forth in the claims and all equivalents thereof.

In the accompanying drawings in which the same reference characters indicate the same parts in all of the views:

Fig. 2 is an enlarged fragmentary plan view of a corner portion of a barn floor showing the pit or trough with the litter conveyor therein and showing the improved flight cleaner mounted in the trough for cooperation with the conveyor flights;

Fig. 3 is an enlarged view looking at the front of the flight cleaner mounting bracket, the view being taken on line 3—3 of Fig. 2 with the cleaner arm being shown in section; and Fig. 4 is an enlarged fragmentary, detail, sectional view taken on line 4—4 of Fig. 2.

Figure 1:
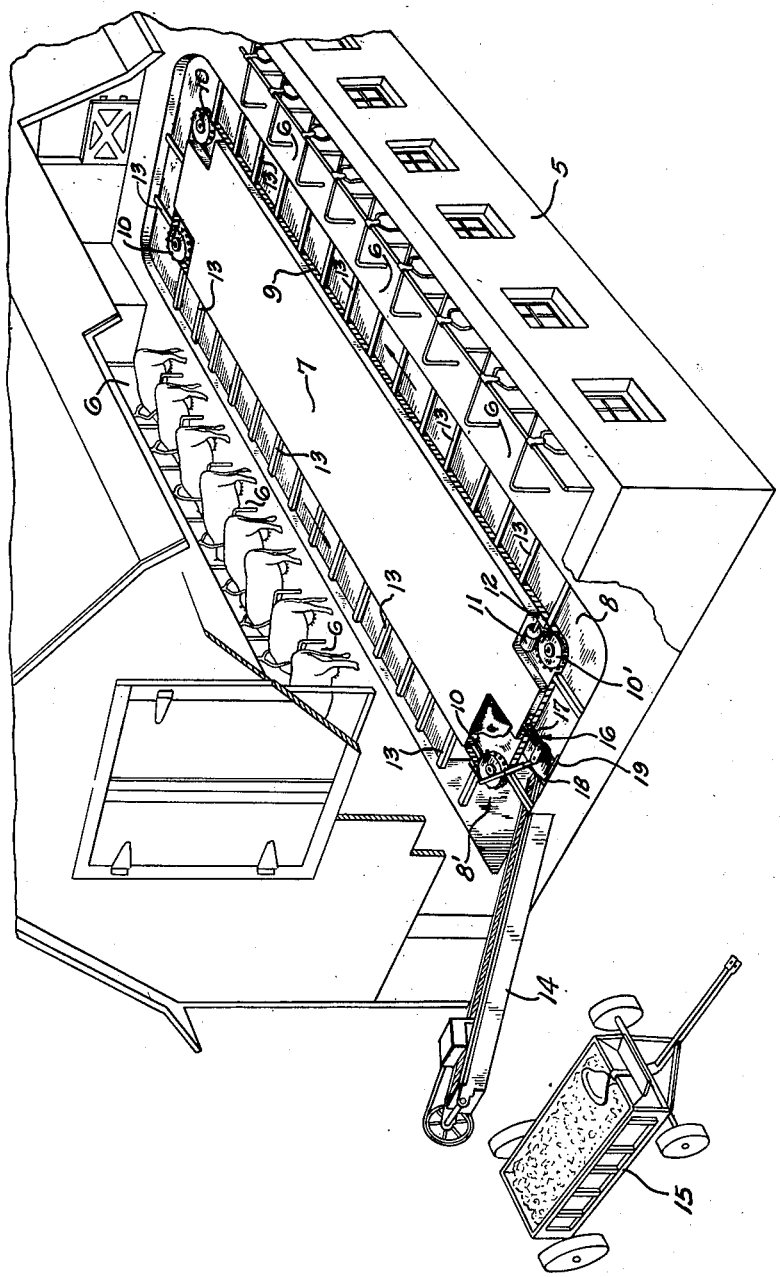
Fig. 1 is a fragmentary perspective view of an animal barn equipped with an automatic barn cleaner, portions being broken away and in section to show details of construction, and the improved flight cleaner being shown in association with the conveyor.

An adaptation of the present invention is shown in Fig. 1 wherein the numeral 5 indicates a cattle barn with animal stalls 6 arranged on opposite sides of a longitudinal aisle 7. Formed in the concrete floor in said aisle is a rectangular trough 8 with the longitudinal extents thereof being adjacent the rear ends of the stall 6. The rectangular trough 8 has disposed therein an automatic barn cleaner or litter conveyor in the form of an endless chain 9 engaged by a plurality of idler sprockets 10 mounted in recesses therefor adjacent the corner portions of the trough 8. One of the sprockets, as sprocket 10', is a driven sprocket receiving power from an electric motor 11 connected with a gear reduction 12. The endless chain 9 of the conveyor traverses inner side wall portions of the trough 8. The inner end portions of spaced apart conveyor flights 13 are suitably secured to the conveyor chain 9. A conveyor flight 13 is formed of angle iron, as best shown in Fig. 4, with the vertical face of the angle iron being foremost in the direction of travel of the conveyor.

As is conventional, litter from the stall 6 is deposited into the trough 8, and when it is desired to clean the barn, the electric motor 11 is set into operation and through the driving connections, the driving sprocket 10' propels the endless chain 9 in the direction indicated by the arrows in the drawings. The movement of the conveyor will cause the angled flights 13 to push the refuse in the trough 8 toward one end thereof, or toward a suitable discharge point. In the exemplification shown, the selected discharge point is at a forward corner portion of the trough wherein the trough is deepened somewhat to provide a pit 8'.

An outgoing conveyor is indicated generally by the numeral 14. It is upwardly outwardly directed with its lower inner end communicating with the trough pit 8' in a position not to interfere with the conveyor flights 13, and being extended through a suitable opening in the barn wall so that its outer end is exterior of the barn and elevated. The outgoing conveyor 14 collects the litter conveyed to the pit 8' by the conveyor flights 13 and transports it exteriorly of the barn so as to automatically drop into a suitable vehicle 15 placed below the outer discharge end of the outgoing conveyor 14. Alternatively, the vehicle 15 may be dispensed with and the outgoing conveyor 14 may discharge the refuse onto a pile exteriorly of the barn.

The present improvements reside particularly in a conveyor flight cleaner indicated generally by the numeral 16. This flight cleaner is for the purpose of continuously freeing all of the conveyor flights 13 of material which might adhere to the surface thereof and retard the operation of the barn cleaner. Preferably, the flight cleaner is mounted relative to the conveyor in a manner so that it will engage and clean each flight 13 as the flight moves around a corner portion of the trough 8. A proper mounting and disposition of a flight cleaner is shown in the drawings wherein the mounting bracket 17 of the flight cleaner extends transversely across an end portion of the trough 8 so as to direct a cleaner arm 18 angularly across the pit with the outer end of the arm 18 normally being positioned adjacent the inner side wall of the outer end of the adjacent longitudinal extent of the trough 8 so as to engage the forwardmost flight 13 immediately prior to the flight being propelled around the trough corner, all as will hereinafter appear.

The construction of the improved flight cleaner is shown most clearly in Figs. 2, 3 and 4. The mounting bracket 16 thereof comprises a pair of oppositely directed complementary members including attaching plates 19 with integral inwardly projecting slotted fins 20. As best shown in Fig. 2, a pair of fins 20 are disposed in overlapping relationship with slots 21 therein in registration and receiving a clamping bolt 22. Before the bolt 22 is tightened, the fins 20 of a mounting bracket may be telescopically extended or retracted in order to exactly adjust the mounting bracket 16 to the transverse dimension of the trough 8. Upon the proper adjustment being effected, the clamping bolt 22 has its nut 23 tightened thereon to lock the fins in adjusted position, as a unit, whereupon the separated plates 19 are then attached to the opposite inner side wall portions of the trough 8 by bolts 24 or similar suitable securing means. The bracket 16 is mounted in the trough at a suitable elevation so as not to interfere with the movement of the conveyor chain 9 which passes therebelow.

There is centrally affixed to the fin portions of the mounting bracket a rearwardly projecting U-shaped clamp 25 whose separated outer ends form bearings for the vertical axis portion 18' of a pivotally mounted cleaner arm 18, previously mentioned. The inner end 18 of the cleaner arm is at right angles to the pivotally mounted axis portion 18' of the cleaner arm. The cleaner arm is in fact formed of the horizontally extending portion 18 and an extensible outer end section 18'', the adjacent end portions of the members 18 and 18'' being telescopically received by a sleeve 26, whereby the length of the cleaner arm may be adjusted to adapt it to conveyor flights of different lengths. The outer free end of the cleaner arm extension 18'' is downturned, as at 27, and there is welded or otherwise secured thereto the upright portion of a flight scraper or plow 28. Said plow or scraper is of angled formation, as shown in Fig. 4, and comprises a horizontal arm 28' whose lower edge is formed as a knife blade, and a vertical leg depending therefrom having on its exposed surface a shouldered recess 29 to embrace the vertical face of an angled flight 13, while the knife edge of the horizontal arm 28' extends across the outer horizontal face of the flight 13.

The scraper arm 18 is normally maintained in a laterally disposed position of rest by a coiled spring 30 which surrounds the axis portion 18' of the conveyor arm, the extremities of the spring 30 being suitably secured so that the spring will be wound upon swinging movement of the arm 18 in a counterclockwise direction. The result is that during movement of the cleaner arm 18 from the full line position of Fig. 2 to the broken line position, the spring 30 will be wound or put under tension, and when the cleaner arm is released from the broken line position of Fig. 2, the expansible force exerted by the spring 30 will automatically return the cleaner arm to the full line position shown.

The operation of the barn cleaner has heretofore been explained. Also, from the description of the conveyor flight cleaner and from the showing in Fig. 2, it will be obvious that the flight cleaner is intended to operate automatically for the successive scraping of the outer surfaces of the conveyor flights 13 during movement of the conveyor in the direction of the arrows in the drawings. The coiled spring 30 causes the cleaner arm 18 to assume the position shown in Fig. 2. During movement of the conveyor, a flight 13 will come into contact with the plow end of the flight cleaner inasmuch as in the position of rest of the arm 18, the plow end 28 extends parallel with the direction of travel of the conveyor in the elongated side of the trough and across the inner end of the flight. As so disposed, the flight lodges within the plow end 28 in the manner shown in Fig. 4. Continued forward movement of the engaged flight 13 will cause it to carry with it the cleaner arm 18, pivoting the latter in a counterclockwise direction and due to the arc of movement of the cleaner arm and the movement of the flight 13 around the corner of the trough 8, the plow end 28 will longitudinally traverse the flight 13, freeing its surfaces of clinging material which it is desired to remove. Ultimately, the plow end 28 will reach the outer end of the flight, as depicted in broken lines in Fig. 2, and upon further movement of said flight, the plow end will free itself of the flight, whereupon the spring 30 will quickly swing the cleaner arm 18 back to the full line position of Fig. 2 ready to engage and clean the next flight on the conveyor in the same manner. If necessary, to accommodate the plow end 28 and the outer end of the cleaner arm extension 18'', the side wall of the pit 8' may be grooved or recessed.

Obviously, the adjustments in the cleaner arm 18 and in the mounting bracket 16 readily adapt the device for different installations and permit its use with pits of varying widths and with various length conveyor flights. Each flight is thoroughly scraped upon each complete cycle of the conveyor.

While the invention has been shown and described in connection wtih an automatic barn cleaner, it should be understood that the improved flight cleaner is capable of more general application and may find utility in connection with the scraping of conveyor flights, regardless of the association or usage to which the conveyor is put. The improved conveyor flight cleaner is moreover of simple and novel construction, is automatic in its operation, and is well adapted for the purposes described.

What is claimed as the invention is:

1. The combination with a barn floor having a pit of generally rectangular contour therein, of an endless litter conveyor disposed within said pit and guided to move horizontally therealong, said conveyor including an endless chain and spaced bar-like flights having their inner ends carried by the chain and extending transversely of the pit, a horizontally disposed arm pivotally mounted at one end adjacent one portion of the pit, the free end portion of said arm extending adjacent another portion of the pit, and a scraper carried by the free end portion of said arm for longitudinal traversing scraping contact with surfaces of successive flights during continued movement of said conveyor.

2. The combination with equipment for cleaning the gutters of dairy barns which includes an endless conveyor having horizontally disposed paddles at spaced intervals adapted to be moved forward in the gutter of the barn, said paddles being generally rectangular in cross-section, a pit at the end of the gutter into which material being moved forward is adapted to be dropped, and scraper means pivotally mounted adjacent said pit for removing all material from each of said paddles as it passes over said pit, said scraper means including a pivotally mounted arm having a substantially right angle shoulder engaging meeting edges of each paddle as it passes over said pit, said arm mounted in the horizontal plane of said paddles.

3. The combination with equipment for cleaning the gutters of dairy barns which includes an endless conveyor having horizontally disposed paddles at spaced intervals adapted to be moved forward in the gutter of the barn, said paddles being generally rectangular in cross-section, a pit at the end of the gutter into which material being moved forward is adapted to be dropped, and scraper means pivotally mounted adjacent said pit for removing all material from each of said paddles as it passes over said pit, said scraper means including a pivotally mounted arm, said scraper arm having angularly related surfaces adapted to engage the top and one side of each paddle as it passes over said pit.

4. In combination with an elongated pit, a conveyor disposed therewithin and movable therealong and having spaced flights of right angular form in cross section, a flight cleaner pivotally mounted at one end adjacent the pit and having its free end portion overlying the pit in the path of movement of the conveyor and having a depending scraper end of right angular form in cross section engageable with the angularly related surfaces of successive conveyor flights moved into contact therewith, the mounting of the cleaner relative to the conveyor being such that the advance movement of the flight engaged by the scraper end of the cleaner will cause said scraper end to traverse the surface of the flight from one end to the other, moving free of said flight at the last-mentioned end.

5. In combination with an elongated pit, a conveyor disposed therewithin and movable therealong and having spaced flights of right angular form in cross section, a flight cleaner pivotally mounted at one end adjacent the pit and having its free end portion overlying the pit and normally extending oblique to the line of travel of the conveyor and in the path of movement of the conveyor and having a depending scraper end of right angular form in cross section engageable with successive conveyor flights moved into contact therewith, the mounting of the cleaner relative to the conveyor being such that the advance movement of the flight engaged by the scraper end of the cleaner will cause said scraper end to longitudinally traverse the flight in one direction and ultimately move free of an end of said flight, and mechanical means engaging the flight cleaner to thereafter automatically swing the same in a reverse position ready to engage an end portion of a successive flight of the conveyor.

6. In combination with an elongated pit, a conveyor disposed therewithin and movable therealong and consisting of a chain with spaced flights of angular form in cross section extending transversely outwardly therefrom, a flight cleaner pivotally mounted at one end adjacent the pit and having its free end portion extending over the pit and normally oblique to the line of travel of the conveyor and in the path of movement of the conveyor and having a depending scraper of angular form in cross section on its outer end engageable with successive conveyor flights moved into contact therewith, the mounting and disposition of the cleaner relative to the conveyor being such that the advance movement of the flight engaged by the scraper end of the cleaner will cause said scraper end to traverse the surface of the flight from one end to the other, moving free of said flight at the last-mentioned end, and mechanical means to thereafter automatically swing the cleaner to a reverse position ready to engage an end portion of a successive flight of the conveyor.

7. In combination with a rectangular pit, an endless conveyor disposed therewithin and guided to move through an arc from one lane of the pit to another lane at right angles thereto, said conveyor carrying spaced, transverse flights, a bracket spanning the second lane of the pit, an arm pivotally mounted at its inner end on said bracket and extending angularly from the second lane to an inner side of the first lane of the pit, means for yieldingly holding said arm in the last mentioned position, and a scraper carried by the outer end of said arm for cleaning engagement with conveyor flights moving into contact therewith, forward movement of the conveyor causing said arm to swing whereby the scraper lengthwise traverses the conveyor flight engaged thereby.

8. In combination with a rectangular pit, a flight-equipped endless conveyor disposed therewithin and guided to move through an arc from one lane of the pit to another lane at right angles thereto, said conveyor carrying spaced, transverse flights of right angular form in cross section, a bracket mounted adjacent the second lane of the pit, an arm pivotally mounted at its inner end on said bracket and extending angularly from the second lane to an inner side of the first lane of the pit, spring means for yieldingly holding said arm in the last mentioned position, and a depending scraper of right angular form in cross section carried by the outer end of said arm for cleaning engagement with conveyor flights moving into contact therewith, the movement of an engaged scraper flight through said arc carrying the scraper therewith and causing said arm to pivotally move against the spring means whereby the scraper longitudinally traverses the flight and disengages the outer end thereof.

9. The combination with equipment for cleaning the gutters of dairy barns which includes an endless conveyor having horizontally disposed paddles at spaced intervals adapted to be moved forward in the gutter of the barn, said paddles being generally rectangular in cross section, a depository adjacent a point in the path of travel of the conveyor into which material being moved forward is adapted to be dropped, and scraper means pivotally mounted adjacent said depository for removing all material from each of said paddles as it passes over said depository, said scraper means including a pivotally mounted arm, said scraper arm having angularly related surfaces adapted to engage the top and one side of each paddle as it passes over said depository.

HERMAN W. BAEHR.

References Cited in the file of this patent

UNITED STATES PATENTS

| Number | Name | Date |
|---|---|---|
| 1,316,911 | Marcy | Sept. 23, 1919 |
| 1,441,841 | Fink | Jan. 9, 1923 |
| 1,748,151 | Stehling | Feb. 25, 1930 |
| 1,800,814 | Boldt | Apr. 14, 1931 |